(12) United States Patent
Schmitz

(10) Patent No.: US 10,100,905 B2
(45) Date of Patent: Oct. 16, 2018

(54) SHIFTING DEVICE AND GEAR UNIT

(71) Applicant: Pinion GmbH, Denkendorf (DE)

(72) Inventor: Michael Schmitz, Niederelbert (DE)

(73) Assignee: Pinion GmbH, Denkendorf (DE)

( * ) Notice: Subject to any disclaimer, the term of this patent is extended or adjusted under 35 U.S.C. 154(b) by 332 days.

(21) Appl. No.: 15/157,886

(22) Filed: May 18, 2016

(65) Prior Publication Data

US 2016/0265625 A1   Sep. 15, 2016

Related U.S. Application Data

(63) Continuation of application No. PCT/EP2014/073902, filed on Nov. 6, 2014.

(30) Foreign Application Priority Data

Nov. 19, 2013 (DE) .................. 10 2013 112 788

(51) Int. Cl.
*F16H 3/08* (2006.01)
*F16H 3/091* (2006.01)
(Continued)

(52) U.S. Cl.
CPC ........... *F16H 3/0915* (2013.01); *B62M 11/06* (2013.01); *F16H 3/10* (2013.01); *F16H 63/18* (2013.01);
(Continued)

(58) Field of Classification Search
CPC ........ B62M 11/16; F16H 3/0915; F16H 3/089
(Continued)

(56) References Cited

U.S. PATENT DOCUMENTS 4,301,690 A * 11/1981 Cavenagh ............... F16H 63/16
74/333
4,628,769 A   12/1986 Nagano
(Continued)

FOREIGN PATENT DOCUMENTS

DE   3443592 A1   8/1985
DE   19720794 A1  11/1998
(Continued)

OTHER PUBLICATIONS

International Preliminary Report on Patentability corresponding to International application No. PCT/EP2014/073902, dated May 24, 2016, 5 pages.
(Continued)

*Primary Examiner* — Ha Dinh Ho
(74) *Attorney, Agent, or Firm* — Reising Ethington P.C.

(57) ABSTRACT

A shilling device for a gear unit, having a shaft, on which a plurality of idler gears are mounted, it being possible for the idler gears to be connected to the shaft by means of switching pawls, the switching pawls being mounted rotatably and being capable of being actuated selectively by way of a camshaft, the camshaft being connected to drive means, in order to rotate the camshaft relative to the shaft in order to actuate the switching pawls, the camshaft having a plurality of actuating sections, in order to actuate the switching pawls which are assigned to the respective idler gears, wherein the actuating sections in each case have at least one surface section, and the surface sections which are assigned to the switching pawls of different idler gears have different pitches.

19 Claims, 8 Drawing Sheets

(51) Int. Cl.
  *B62M 11/06* (2006.01)
  *F16H 3/10* (2006.01)
  *F16H 63/18* (2006.01)
  *F16H 63/30* (2006.01)
  *F16H 3/083* (2006.01)

(52) U.S. Cl.
  CPC ............ *F16H 63/30* (2013.01); *F16H 3/083* (2013.01); *F16H 2063/3093* (2013.01)

(58) Field of Classification Search
  USPC .................... 74/363, 336 R, 337.5; 280/238
  See application file for complete search history.

(56) References Cited

U.S. PATENT DOCUMENTS

| | | | | |
|---|---|---|---|---|
| 5,667,233 | A * | 9/1997 | Metzinger | B62L 1/00 280/212 |
| 8,628,447 | B2 * | 1/2014 | Schmitz | B62M 11/06 475/302 |
| 9,194,461 | B2 | 11/2015 | Schmitz et al. | |
| 2010/0218630 | A1 | 9/2010 | Matsumoto et al. | |
| 2011/0011193 | A1 * | 1/2011 | Matsumoto | F16H 63/18 74/337.5 |
| 2011/0130242 | A1 | 6/2011 | Göbel | |
| 2011/0251008 | A1 | 10/2011 | Schmitz et al. | |
| 2014/0090500 | A1 | 4/2014 | Schmitz et al. | |

FOREIGN PATENT DOCUMENTS

| | | |
|---|---|---|
| DE | 102008064514 A1 | 7/2010 |
| DE | 102009056206 A1 | 6/2011 |
| DE | 102011106107 A1 | 12/2012 |
| WO | WO2011073360 A1 | 6/2011 |

OTHER PUBLICATIONS

German Search Report, in German, corresponding to DE application No. 102013112788.6, dated Jul. 24, 2014, 5 pages.

International Search Report, in German, corresponding to International application No. PCT/EP2014/073902, dated Feb. 5, 2015, 9 pages.

* cited by examiner

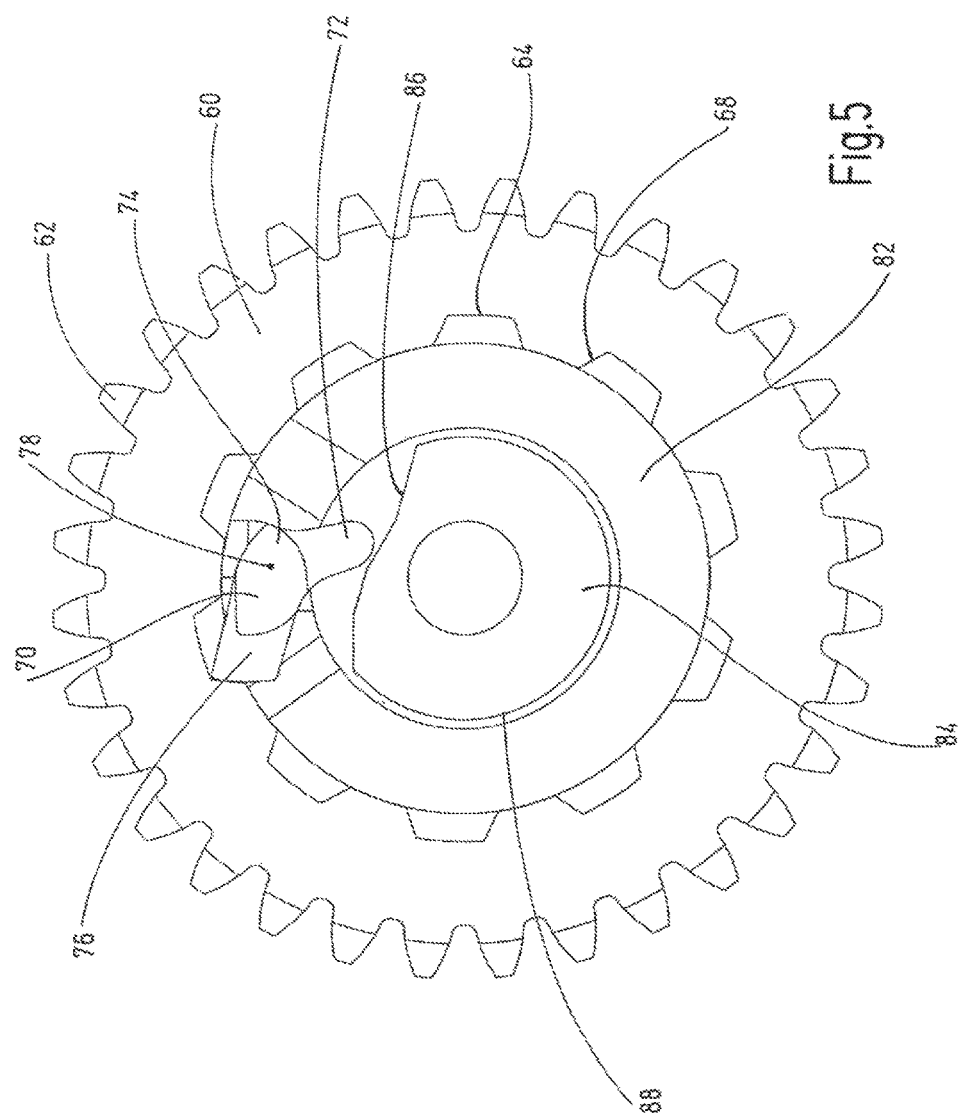

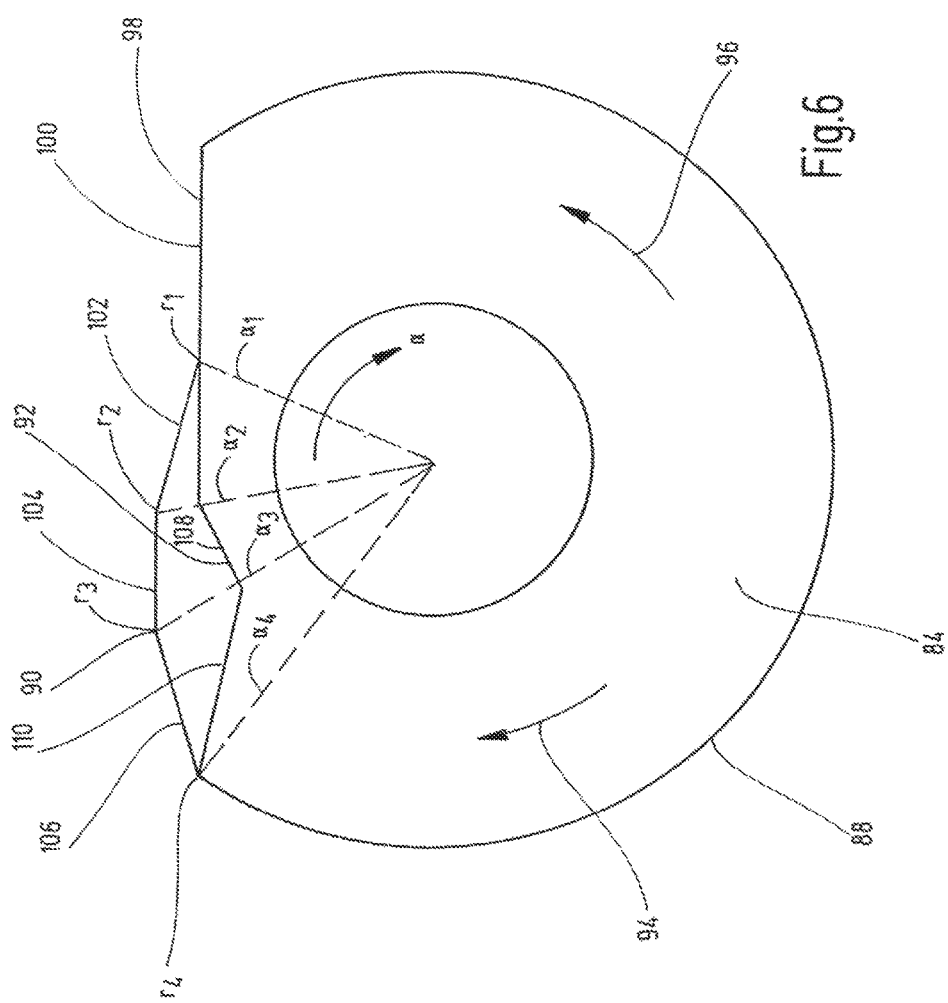

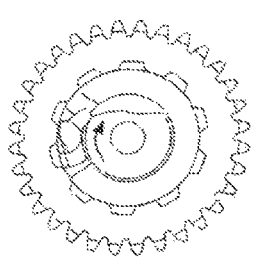
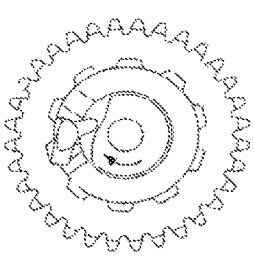
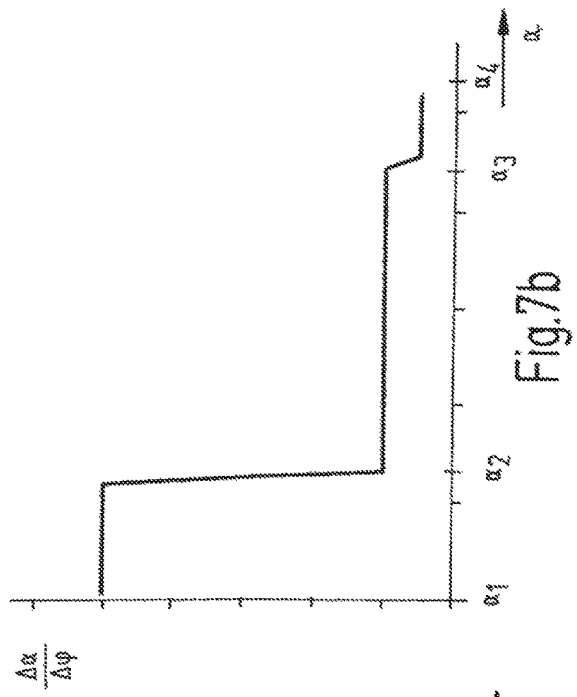
Fig. 7b
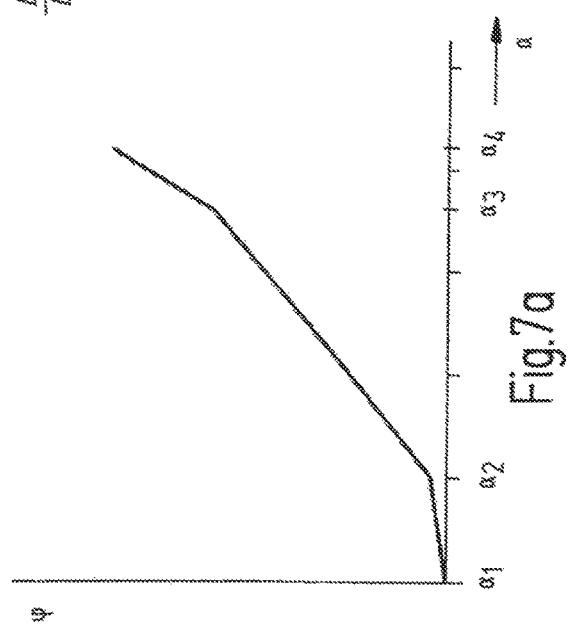
Fig. 7a

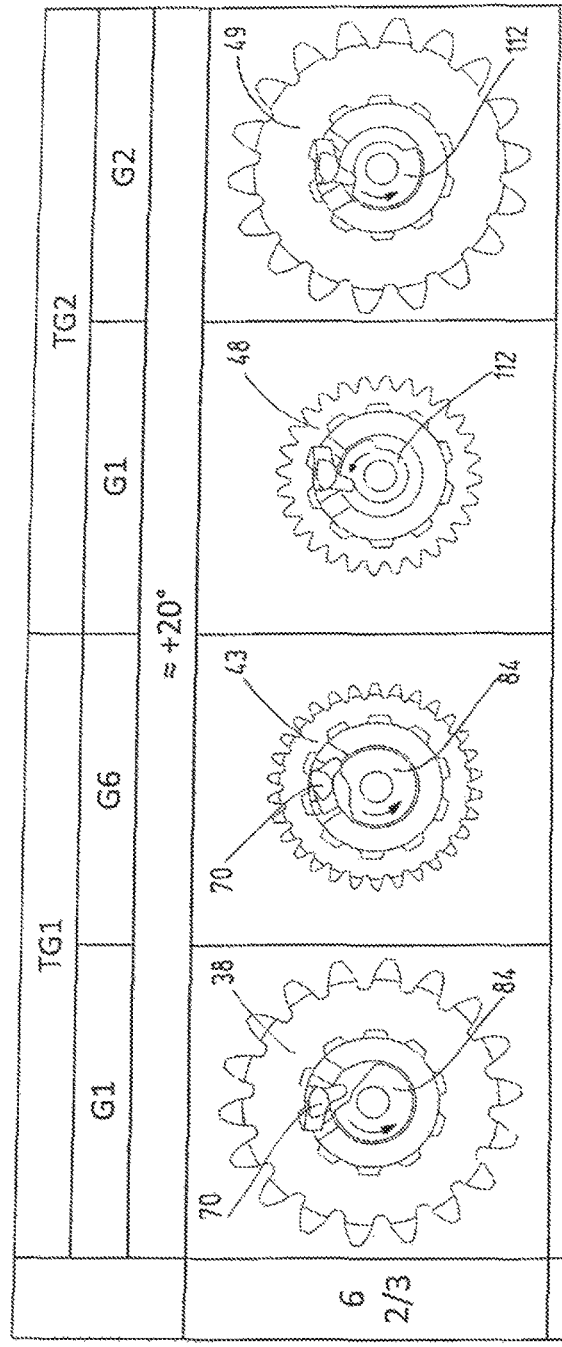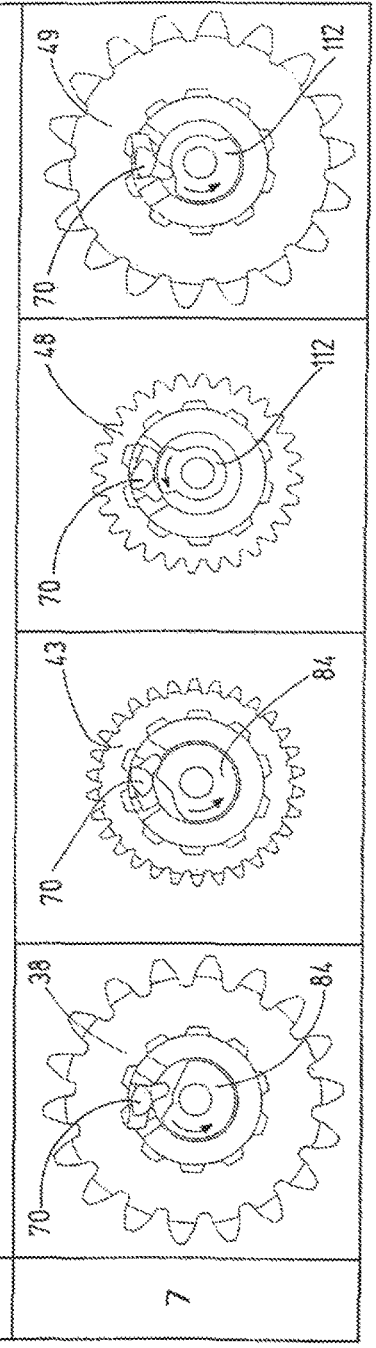
Fig.8c
Fig.8d

SHIFTING DEVICE AND GEAR UNIT

CROSS-REFERENCE TO RELATED APPLICATIONS

This is a Continuation application of international patent application PCT/EP2014/073902, filed Nov. 6, 2014, which claims the priority of German patent application DE 10 2013 112 788.6, filed Nov. 19, 2013. The entire contents of these priority applications are incorporated herein by reference.

FIELD OF THE INVENTION

The present invention relates to a shifting device for a gear unit, in particular for a vehicle which is driven by way of muscle power, having a shaft, on which a plurality of idler gears are mounted, the shaft being configured as a hollow shaft and it being possible for the idler gears to be connected to the shaft by means of switching pawls, the switching pawls being mounted rotatably and being capable of being actuated selectively by way of a camshaft, the camshaft being connected to drive means, in order to rotate the camshaft relative to the shaft in order to actuate the switching pawls, the camshaft having a plurality of actuating sections, in order to actuate the switching pawls which are assigned to the respective idler gears.

Furthermore, the present invention relates to a shifting device for a gear unit, in particular for a vehicle which is driven by way of muscle power, having a shaft, on which a first plurality of idler gears and a second plurality of idler gears are mounted which form idler gears of two component gears of the gear unit which are connected one after another, it being possible for the idler gears to be connected to the shaft by means of switchable freewheels, and having at least one camshaft which has a plurality of actuating sections, in order to actuate the switchable freewheels, and the at least one camshaft being connected to drive means, in order to rotate the camshaft relative to the shaft for selectively actuating the switchable freewheels.

Finally, the present invention relates to a gear unit, in particular for a vehicle which is driven by way of muscle power, having an input shaft, an output shaft and having an idler shaft.

Shifting devices and gear units of this type serve to step up and/or step down drive power, in particular muscle power, and to facilitate driving of a vehicle as a result.

BACKGROUND OF THE INVENTION

DE 10 2011 106 107 A1 has disclosed a bicycle gear of this type with a shifting device. Said bicycle gear has an input shaft, an idler shaft and an output shaft, switchable idler gears which form, together with gearwheels of the input shaft and the output shaft form gear, pairs of two component gears of the bicycle gear being mounted on the idler shaft. The idler gears of the idler shaft are switched by means of switchable freewheels, it being possible for the freewheels to be switched selectively by means of a rotatable camshaft which is arranged in the idler shaft. The switchable freewheels in each case have switching pawls which are mounted pivotably and can be actuated by means of actuating sections of the camshaft, in order to connect the idler gears fixedly to the idler shaft so as to rotate with it. Since the rotational rate and/or the circumferential face of the camshaft for actuating different freewheels is limited, and since shifting in both component gears requires synchronization in a manner dependent on the load change, at least one switching pawl remains pivoted out or actuated after shifting operations of this type in both component gears, which can lead to permanent clicking in at least two gear stages of the bicycle gear. Furthermore, the switchable freewheels bring it about that, in the case of a downshift, either a load-dependent force has to be exerted on the camshaft or the drive power which is introduced into the gear has to be reduced, in order to actuate the respective switching pawl and to make a downshift possible.

BRIEF SUMMARY OF THE INVENTION

It is therefore a potential object of the present invention to provide an improved s Kling device and an improved gear unit, in particular for a vehicle which is operated by way of muscle power, which shifting device and gear unit make improved shifting comfort and improved smooth running possible with low technical outlay.

In a shifting device which was mentioned at the outset, said object may be achieved according to a first aspect of the invention by virtue of the fact that the actuating sections in each case have at least one surface section, and the surface sections which are assigned to the switching pawls of different idler gears have different pitches, in order to exert different forces on the switching pawls.

In a shifting device which was mentioned at the outset, said object may be achieved according to a second aspect of the invention by virtue of the fact that the switching pawls and the actuating sections which are assigned to different idler gears are configured in such a way that, upon actuation of the respective switching pawls, a change in the rotary angle of the camshaft brings about different changes in the rotary angle of the respective switching pawls.

In a shifting device which was mentioned at the outset, said object may be achieved according to a third aspect of the invention by virtue of the fact that at least one actuating section has a plurality of surface sections with different pitches, in order to exert different threes on the switching pawls as a result of the rotation of the camshaft in a manner which is dependent on a rotary position of the camshaft, or in order to pivot the switching pawls in or out at different rotational speeds.

In a shifting device which was mentioned at the outset, said object may be achieved according to a fourth aspect of the invention by virtue of the fact that the actuating sections are configured to perform a gear change in both component gears in a plurality of steps which follow one another, the actuating sections being of different configuration in such a way that the gear change in the two component gears has at least one more step than a gear change in merely one of the component gears.

In a shifting device which was mentioned at the outset, said object may be achieved according to a fifth aspect of the invention by virtue of the fact that the actuating sections are configured, in the case of a gear change in both component gears, to simultaneously actuate the freewheels of two idler gears in a first of the component gears before a load change between in each case two idler gears of the two component gears, and to release the freewheel of one of the idler gears after the load change in a second of the component gears.

Finally, in the gear unit which was mentioned at the outset, said object may be achieved by virtue of the fact that the idler shaft has a shifting device in accordance with the present invention.

In the context of the present invention, a pitch of the surface sections is understood to mean a change in the radius of the camshaft in a manner which is dependent on a rotary angle of the camshaft. In the context of the present invention, the actuation of the freewheels or the switching pawls is understood to mean an activation of the freewheels or the switching pawls and a release is understood to mean a deactivation of the freewheels or the switching pawls.

By virtue of the fact that the surface sections of the actuating sections which are assigned to different idler gears have different pitches, the switching pawls can be moved at a different speed and/or with a different power step-up or step-down transmission ratio in a manner Which is dependent on the rotation of the camshaft, with the result that an individual actuation of the respective switching pawls is possible. As a result of said individual setting of the actuation of the switching pawls, the shifting operations for the individual gear stages can be set individually, as a result of which, in the case of shifting operations in both component gears, the switching pawls of individual idler gears can be pivoted in or out more rapidly and, as a result, a switching pawl which corotates can be pivoted in after the load change. As a result, permanent clicking of the shifting device in certain gears can be avoided, as a result of which a lower-noise shifting device can be provided. Furthermore, the exertion of force can be adapted to the torques which are dependent on the gear stage by way of the individual adaptation of the actuation of the switching pawls, as a result of which more comfortable shifting of the shifting device becomes possible.

By virtue of the fact that, in the second aspect of the present invention, the switching pawls are configured in such a way that, upon actuation of the switching pawls of more different idler gears, a change in the rotary angle of the camshaft brings about different changes in the rotary angle of the respective switching pawls, the switching pawls can be pivoted in or out individually at different speeds and with different forces, as a result of which an individual actuation of the switching pawls for the different gear stages becomes possible. As a result, the shifting operations can be set in a comfortable manner and, at the same time, switching pawls can be pivoted in and out individually, as a result of which, in the case of a shifting operation in both component gears, permanent clicking of a corotating switching pawl can be avoided.

By virtue of the fact that, in the third aspect of the present invention, at least one actuating section has a plurality of surface sections with different pitches, in order to exert different forces on the switching pawls as a result of the rotation of the camshaft in a manner which is dependent on a rotary position of the camshaft, different forces can be exerted depending on the pivoting position of the switching pawls during the downshift under load, as a result of which the switching pawls can be released from an internal toothing system of the idler gears with low force and can be pivoted rapidly into the shaft, as a result of which the downshift under load is possible in a more comfortable manner.

By virtue of the fact that, in the fourth aspect of the present invention, a simultaneous gear change in both of the component gears has one more part step than a gear change in merely one of the component gears, a switchable freewheel can be released after the load change, with the result that permanent corotating of the freewheel after the load change can be avoided and therefore a lower-noise gear can be provided.

By virtue of the fact that, in the fifth aspect of the present invention, the actuating sections are configured to actuate or to activate the freewheels of two idler gears in the first component gear before the load change and to release the freewheel of one of the idler gears in the second component gear after the load change, permanent corotation of one of the freewheels and therefore permanent clicking can be avoided after a gear change in both component gears. By virtue of the fact that the actuating sections are configured to actuate or to activate the freewheels of two idler gears in the first component gear before the load change, permanent corotation of one of the freewheels can also be avoided in the opposite shifting direction or in both shifting directions, with the result that, after the gear change in both component gears, merely the freewheels of two idler gears in both component gears are actuated or activated.

As a consequence, a shifting device and a gear unit can be provided as a result of the different aspects of the present invention, in which comfortable shifting and low-noise operation are possible with low technical outlay.

The object of the present invention may thereto be completely achieved.

In one preferred embodiment, the actuating sections which are assigned to the switching pawls of different idler gears have surface sections with different pitches at corresponding rotary angle positions of the camshaft.

As a result, individual lever ratios can be achieved during the pivoting in or out of the switching pawls, with the result that an individual actuation of the switching pawls is possible.

In one preferred embodiment, the actuating sections which are assigned to the switching pawls of different idler gears have at least one surface section which has different angles of inclination relative to a respectively correspondingly adjoining circumferential face of the camshaft.

As a result, firstly a great force can be exerted on one of the switching pawls during the downshift and, at the same time, a switching pawl of another idler gear can be pivoted out rapidly during the upshift, with the result that a plurality of different consecutive actuations of switching pawls are possible within a small rotary angle of the camshaft.

Furthermore, it is preferred if, upon a rotation of the camshaft in order to shift into a higher gear stage of the gear unit, the surface section which adjoins the circumferential face is configured to pivot out the switching pawls.

As a result, a switching pawl of a gear stage can be pivoted out individually and rapidly, with the result that a complex shifting operation is possible even in both component gears in the case of a small rotary angle of the camshaft.

Furthermore, it is preferred if the pitch of a surface section which is assigned to a first one of the idler gears is greater than the pitch of the surface sections which are assigned to a plurality of further idler gears.

As a result, the pivoting in and out of the switching pawls can be adapted individually to the respective gear stage, as a result of which comfortable shifting is possible.

It may be particularly preferred here if the first idler gear is assigned to a gear stage of the gear unit which is lower than at least one further gear stage of the gear unit.

As a result, the switching pawl of said low gear stage can be pivoted out rapidly, with the result that a plurality of switching pawls can be actuated one after another over a small rotary angle of the camshaft in the case of a shifting operation in both component gears.

Furthermore, it may be particularly preferred if the surface sections form planar surfaces with the different pitches.

As a result, the camshaft and, in particular, the actuating sections can be manufactured with low technical outlay, since the planar surfaces on the camshaft can be manufactured simply.

Furthermore, it may be preferred if at least one of the actuating sections is of convex configuration at least in sections in an axial viewing direction with respect to a secant of the camshaft.

As a result, the downshift under load becomes more comfortable, since the static friction or adhesion of the switching pawl in an internal toothing system of the idler gears can be overcome with low force and with low technical outlay and the switching pawl can be pivoted out rapidly afterward.

Furthermore, it may be preferred if an actuating section is of concave configuration at least in sections in an axial viewing direction with respect to a secant of the camshaft.

As a result, the respective camshaft can be pivoted out completely with a small rotary angle of the camshaft and with low technical outlay, with the result that further shifting steps and actuations of switching pawls are possible during shifting in both component gears.

In one special embodiment, the pitch of the surface sections increases at least sections in a rotational direction of the camshaft for pivoting in the respective switching pawl.

As a result, in the case of a downshift under load, the force which is exerted on the camshaft can be reduced slowly, with the result that the switching pawl is released from the internal toothing system of the idler gears with a high force and can be pivoted in with a rapid movement.

It may be particularly preferred here if the pitch of at least two surface sections which follow one another in the rotational direction increases.

As a result, the force-displacement profile of the switching pawl can be set precisely in a manner which is dependent on the rotation of the camshaft.

The gear unit may preferably have two component gears which form a plurality of gear stages, the first one of the idler gears forming a low gear stage of one of the component gears.

As a result, the switching pawl of the first one of the idler gears can be pivoted in rapidly as a result of the special configuration of the actuating section, in order, in the case of a shifting operation in both component gears, to make a plurality of steps which follow one another for pivoting switching pawls in and out possible.

Furthermore, it may be preferred if the camshafts are synchronized in such a way that, in the case of the load change, the switchable freewheels of two idler gears which are assigned to in each case different ones of the component gears are actuated and released alternately.

As a result, a particularly precise load change is possible during shifting in both component gears, as a result of which a brief upshift over a plurality of gear stages or a brief downshift over a plurality of gear stages can be avoided.

Furthermore, it may be preferred if the actuating sections are configured in such a way that the gear change in the two component gears takes place substantially in three steps which follow one another.

As a result, a precise and reliable shifting operation in both component gears is possible.

Furthermore, it may be preferred if the actuating sections are configured in such a way that the gear change in merely one of the two component gears takes place substantially in two steps which follow one another.

Furthermore, it may be preferred if the steps of the gear change take place in different rotational positions of the camshafts.

As a result, the shifting steps can take place with low technical outlay by way of rotation of the camshafts. It may be particularly preferred here if the camshafts rotate or corotate in the same direction during the shifting operation in both component gears.

Overall, the gear change is formed by way of the first step of the simultaneous actuation of the freewheels of two idler gears of the first component gear, by way of the second step of the load change and the third step that the freewheel of one idler gear of the second component gear is released.

Furthermore, it may be preferred if the freewheel of merely one of the idler gears is actuated after the load change in the second component gear. Here, in particular, the freewheel of merely one of the idler gears is actuated after the freewheel of the one idler gear in the second component gear is released.

As a result, the shifting operation can be concluded completely, with the result that, after the shifting operation, merely the freewheels of the idler gears which transmit the load are actuated and a corotation of freewheels and permanent clicking can be avoided.

Overall, the switching pawls of different gear stages or different idler gears can be actuated individually with different force-displacement profiles, as a result of which the shifting becomes more comfortable. Furthermore, in the case of shifting operations in both component gears, the switching pawls of a low gear stage can be pivoted out rapidly by way of low rotation of the camshaft, as a result of which a great rotary angle of the camshaft is available for further consecutive actuations of switching pawls. Furthermore, as a result of the release of a freewheel after the load change, permanent clicking of a corotating switching pawl can be avoided and therefore a low-noise gear unit can be provided.

It goes without saying that the features which are men toned in the above text and are still to be explained in the following text can be used not only in the respectively specified combination, but rather also in other combinations or on their own, without departing from the scope of the present invention.

Exemplary embodiments of the invention are shown in the drawing and will be explained in greater detail in the following description. In the drawing:

BRIEF DESCRIPTION OF THE DRAWINGS

FIG. 5 shows an outline sketch for explaining the method of operation of the switching pawls and the camshaft in an axial viewing direction, FIG. 6 shows an outline sketch of a camshaft in an axial viewing direction with two different actuating sections in a superimposed illustration, FIGS. 7a, b show rotary angle diagrams of the switching pawls in order to explain the method of operation of the actuating sections, and FIGS. 8a-d show outline sketches in order to explain shifting operations in both component gears.

DETAILED DESCRIPTION OF THE ILLUSTRATED EMBODIMENTS

Figure 1:
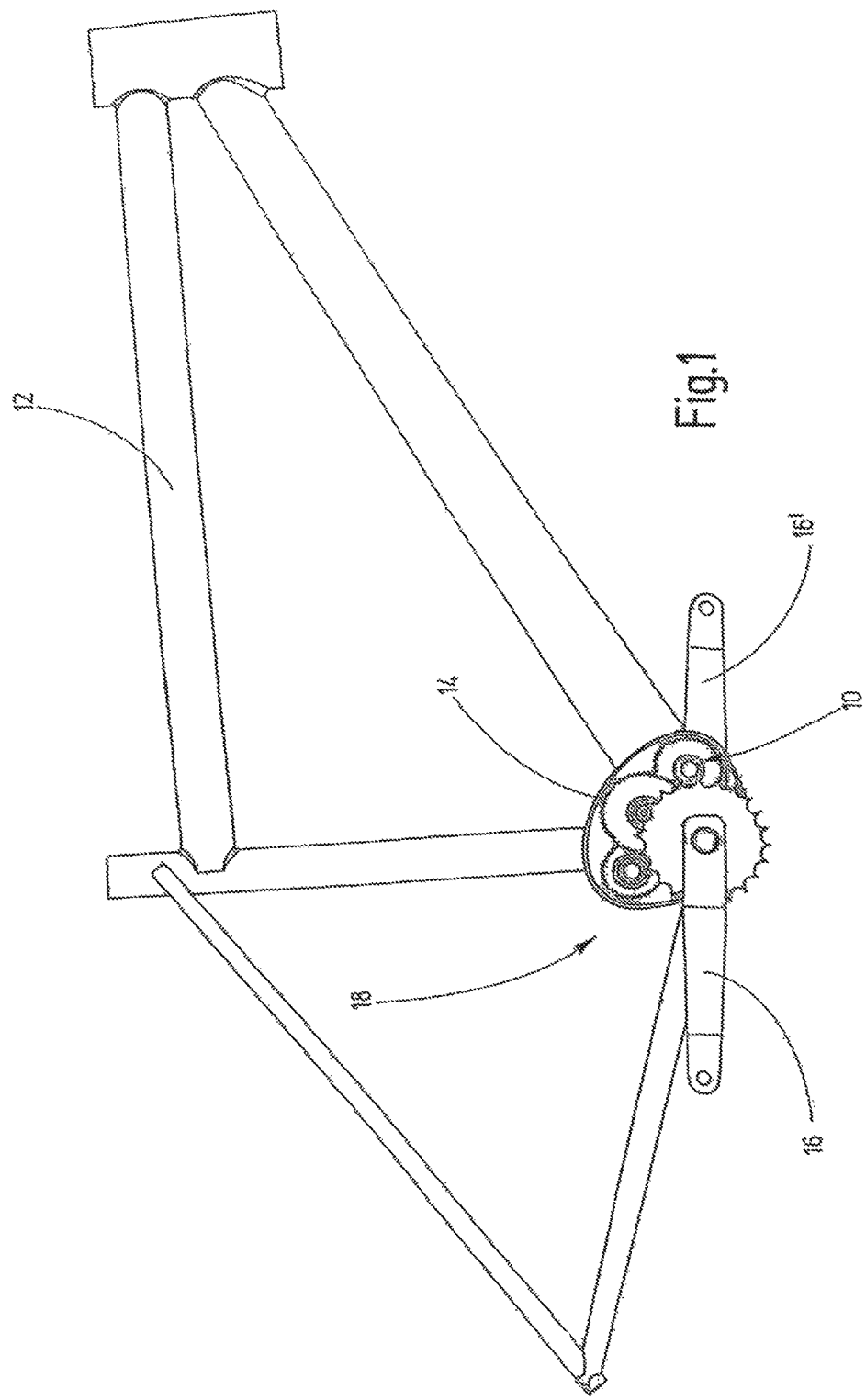
FIG. 1 shows a side view of a bicycle frame with a multiple-speed gear.

In FIG. 1, a gear unit is denoted overall by 10.

FIG. 1 shows a side view of a bicycle frame 12 which has a gear housing 14, in which the gear unit 10 is received. In this illustration, the gear unit 10 is indicated only diagrammatically and is configured as a compact unit which is preferably arranged in a gear cage (not shown here). Herein, the gear unit 10 is described, by way of example for use in a bicycle, the use in other vehicles which are operated by way of muscle power also being possible, however. It goes without saying that the gear unit 10 can also be used for vehicles, in which muscle power is used in combination with a drive machine to drive the vehicle.

Together with pedal cranks 16 and 16', the gear unit 10 and the gear housing 14 form a multiple-speed gear 18.

Figure 2:
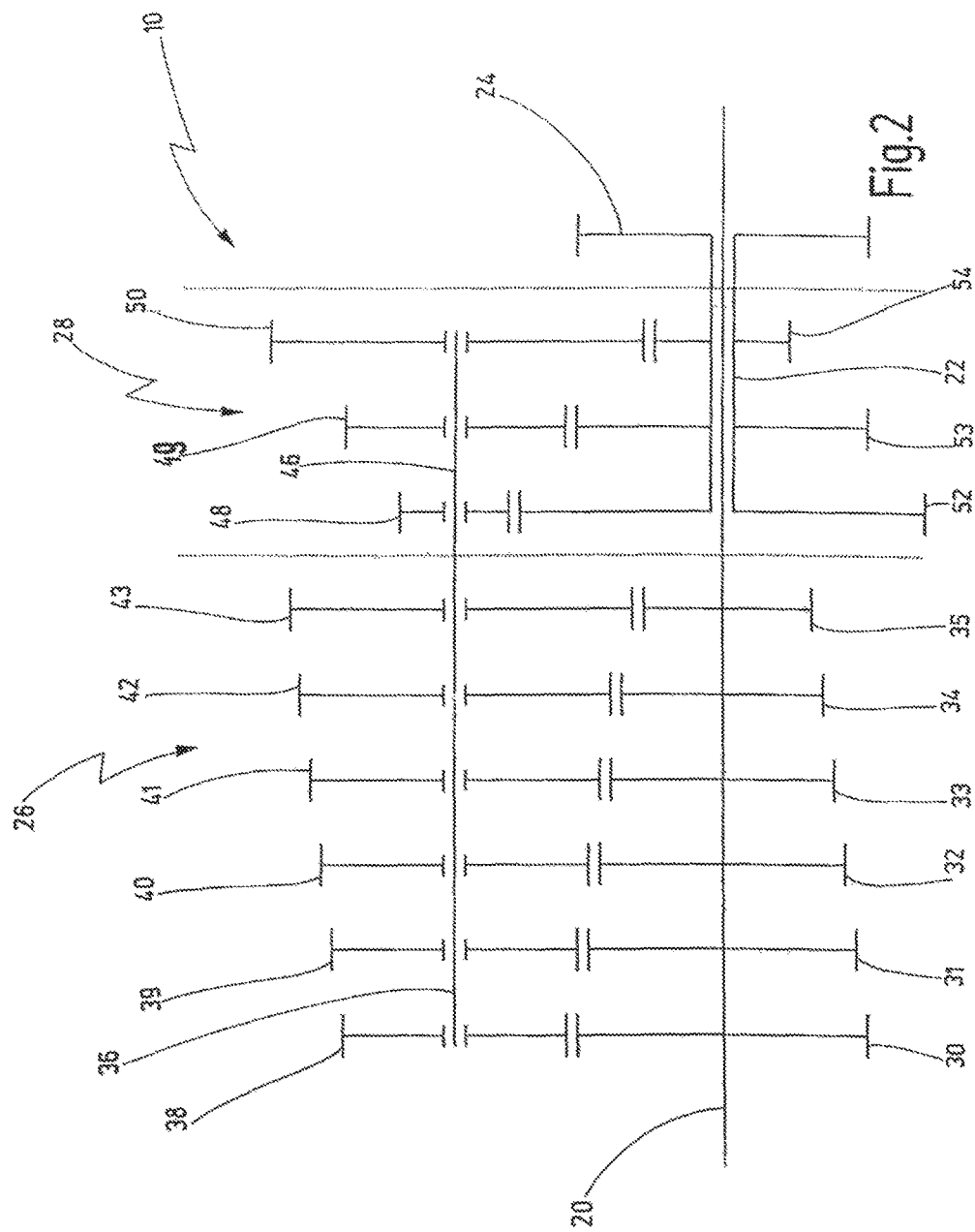
FIG. 2 shows a shifting diagram of a multiple-speed gear with two component, gears and a common idler shaft.

FIG. 2 shows a shifting diagram of the gear unit 10.

The gear unit 10 has an input shaft 20 and an output shaft 22. The input shaft 20 is configured as a through shaft. The output shaft 22 is configured as a hollow shaft. The input shaft 20 and the output shaft 22 are arranged coaxially with respect to one another. The input shaft 20 which is configured as a through shaft can be connected to cranks at opposite ends in order to drive the input shaft 20. The output shaft 22 is connected fixedly to a chain ring 24 so as to rotate with it, which chain ring 24 forms an output element of the gear unit 10.

The gear unit 10 has a first component gear 26 and a second component gear 28. A plurality of drive gears 30, 31, 32, 33, 34, 35 are mounted on the input shaft 20. The first component gear 26 has an idler shaft 36. Driven gears 38, 39, 40, 41, 42, 43 are mounted on the idler shaft 36. The driven gears 38 to 43 are configured as idler gears.

The driven gears 38 to 43 can be connected to the idler shaft 36 by means of switching means (not shown). The driven gears 38 to 43 and the drive gears 30 to 35 form gear pairs which have different transmission ratios, with the result that different gear stages can be realized by way of selective connection of the driven gears 38 to 43 to the idler shaft 36.

The second component gear 28 has an input shaft 46. Drive gears 48, 49, 50 are mounted on the input shaft 46. The drive gears 48 to 50 are configured as idler gears. The drive gears 48 to 50 can be connected fixedly to the input shaft 46 so as to rotate with it by means of switching means which are preferably configured as switchable freewheels. The driven gears 52, 53, 54 are mounted on the output shaft 22. The driven gears 52 to 54 are in meshing engagement with the drive gears 48 to 50.

Gear pairs which have different transmission ratios are formed by way of the driven gears 52 to 54 and drive gears 48 to 50 which mesh with one another. The drive gears 48 to 50 can be connected fixedly to the input shaft 46 so as to rotate with it by means of switching means (not shown), as a result of which different, selectable gear stages of the second component gear 28 are formed.

The idler shaft 36 of the first component gear 26 is connected fixedly to the input shaft of the second component gear 28 so as to rotate with it. The idler shaft 36 is preferably configured in one piece with the input shaft 46.

The possible gear stages of the first component gear 26 which can be realized are multiplied by the gear stages of the second component gear 28 by virtue of the fact that the first component gear 26 is connected to the second component gear 28. Eighteen gears can therefore be realized by way of the gear unit 10 which is shown in FIG. 2.

In order to shift through the eighteen gears of the gear unit 10 which is shown here, first of all the six gears of the first component gear 26 are shifted through, and, in order to shift from sixth gear into seventh, shifting is carried out in the first component gear 26 from sixth gear, that is to say the idler gear 43, back into first gear, that is to say to the idler gear 38, and at the same time shifting is carried out in the second component gear 28 from first gear, that is to say the idler gear 48, into second gear, that is to say to the idler gear 49. The shifting operation from twelfth to thirteenth gear takes place in a corresponding manner.

The idler shaft 36 which is connected in one piece to the input shaft 46 of the second component gear 28 is configured as a hollow shaft. Switching pawls are mounted on the idler shaft 36 and the input shaft 46, which switching pawls can be actuated by means of two rotatably mounted camshafts which are arranged in the hollow shaft, and which switching pawls connect the idler gears of the two component gears 26, 28 selectively to the idler shaft 36 or the input shaft 46 fixedly so as to rotate with it, in order to realize the individual gear stages. In order to connect the idler gears fixedly to the hollow shaft so as to rotate with it, the internal gears have an internal toothing system, as is explained in greater detail in the further text. In one alternative embodiment, the gear unit 10 has merely one camshaft which is accordingly assigned to the idler gears of one of the component gears 26, 28, in order to connect them fixedly to the hollow shaft so as to rotate with it. In said embodiment, the respectively other component gear 26, 28 can be configured as a simple gear set with two gearwheels.

Figure 3:
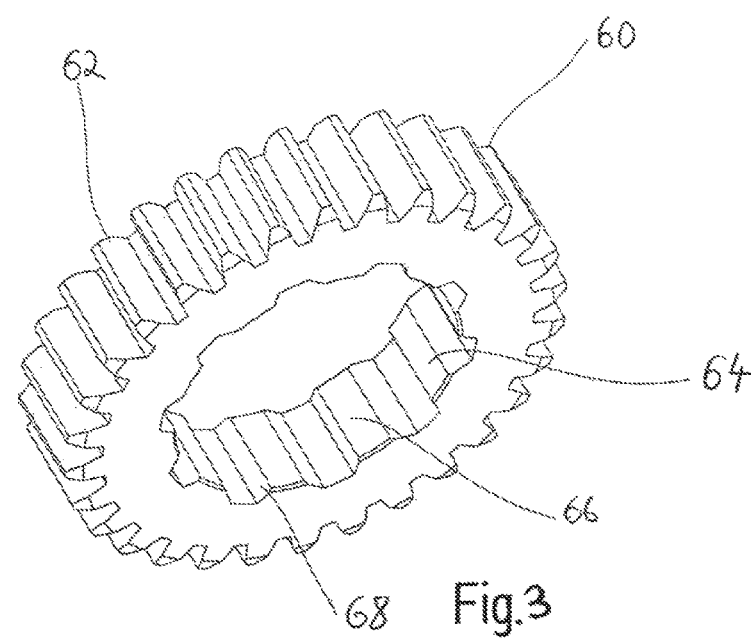
FIG. 3 shows a perspective illustration of an idler gear with an internal toothing system.

FIG. 3 shows a switchable idler gear with internal toothing system which is denoted in general by 60.

The idler gear 60 has an external toothing system 62 and an internal toothing system 64. The external toothing system 62 is formed on an outer circumferential face. The internal toothing system 64 is formed on an inner circumferential face of the idler gear 22. The internal toothing system 64 has sliding sections 66 and engagement sections 68. The sliding sections 66 are formed by surfaces which are configured in the circumferential direction of the idler gear 60. The engagement sections 68 are configured between the sliding sections 66 at an angle with respect to the sliding sections 66.

The external toothing system 62 serves to mesh with other gearwheels. The internal toothing system 64 serves to mount the idler gear 60 on the idler shaft 36 or the input shaft 46 and to connect it fixedly to the idler shaft 36 or the input shaft 46 so as to rotate with it by means of switching means. Here, the sliding sections 66 serve to mount the idler gear 60 rotatably on the shaft and to slide said idler gear 60 on the shaft.

Switching means (not shown here) which will be explained in greater detail in the further text can engage into the engagement sections 68, in order to correspondingly connect the idler gear 60 fixedly to the shaft so as to rotate with it.

Figure 4:
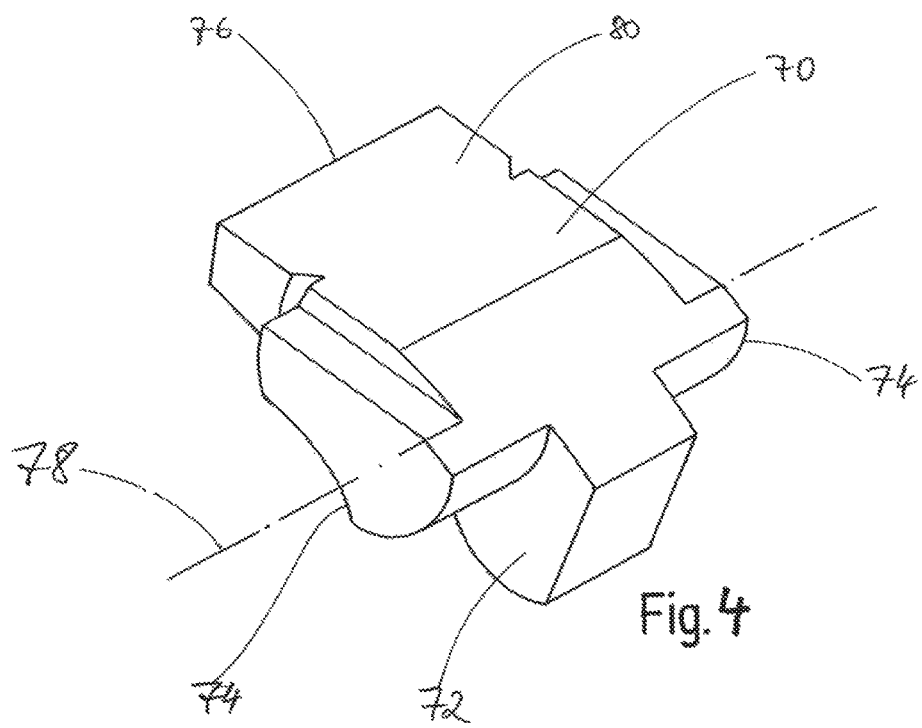
FIG. 4 shows a perspective illustration of a switching pawl.

FIG. 4 shows a switching pawl as switching means for connecting the idler gear 60 fixedly to the idler shaft 36 or the input shaft 46 so as to rotate with it, said switching pawl being denoted in general by 70. The switching pawl 70 has an actuating section 72 which is formed on an underside of the switching pawl 70. On two lateral sections, the switching pawl 70 in each case has a bearing section 74. The switching pawl 70 has an engagement section 76. The engagement section 76 is formed at an end of the switching pawl 70 which lies opposite the actuating section 72. The bearing sections 74 are configured on opposite sides of the switching pawl 70, to be precise between the actuating section 72 and the engagement section 76.

The bearing sections 74 serve to mount the switching pawl 70 on the shaft such that it can be rotated or pivoted about a rotational axis 78. Here, the switching pawl 70 is mounted on the shaft in such a way that the actuating section 72 points toward the interior of the shaft. Furthermore, the switching pawl 70 is prestressed by means of a spring element (not shown) in such a way that, in the unloaded state, the actuating section 72 is pivoted radially to the inside and the engagement section 76 is pivoted radially to the outside. The actuating section 72 serves to be pressed radially to the outside by means of the camshaft which is arranged in the shaft, in order to correspondingly pivot the engagement section 76 radially to the inside about the rotational axis 78.

If the engagement section 76 is pivoted radially to the outside and protrudes with respect to the shaft, it can be brought into engagement with the engagement section 68 of the internal toothing system 64 of the idler gear 60 in a rotational direction of the idler gear 60 and can thus connect the idler gear fixedly to the shaft in the rotational direction so as to rotate with it.

Furthermore, the switching pawl 70 has a sliding section 80 which serves to pivot the switching pawl 70 radially to the inside if the idler gear 60 is rotated in a direction which is opposed to the rotational direction relative to the shaft and thus serves as a switchable freewheel.

FIG. 5 shows a diagrammatic sectional view of the gear unit 10 in an axial viewing direction of one of the idler gears, in order to explain the method of operation of the switching pawls 70 or the switchable free heels. Identical elements are denoted by identical designations, merely the special features being explained here.

In FIG. 5, the shaft is denoted generally by 82 and corresponds to the idler shaft 36 or the input shaft 46. A camshaft 84 is mounted in the shaft 82, which camshaft 84 corotates with the shaft 80, in order to maintain the respective switching state, and is rotated or turned relative to the shaft 82, in order to change the switching state of the gear unit 10, as is explained in greater detail in the further text. In general, the camshaft 84 has an actuating section 86 which, in this embodiment, is formed as a recess in the round circumferential face 88 of the camshaft 84. If the actuating section 86 is rotated into the region below the switching pawl 70, the actuating section 72 of the switching pawl 70 pivots inward, with the result that the engagement section 76 pivots outward and engages into the engagement section 68 of the idler gear 60. As a result, the idler gear 60 is connected fixedly in a rotational direction on the shaft 82 so as to rotate with it. If the camshaft is rotated further and the circumferential face 88 is arranged below the switching pawl 70, the actuating section 72 is pressed to the outside and the engagement section 76 is pivoted in correspondingly, with the result that the idler gear 60 is mounted on the shaft 82 such that it can be rotated in both rotational directions. As a result, individual ones of the idler gears can be connected fixedly to the shaft 82 so as to rotate with it selectively by way of rotation of the camshaft 84, and therefore individual gear stages can be shifted selectively in a corresponding manner. In one alternative embodiment, the actuating sections 86 can also be of elevated configurations with respect to the circumferential face 88, in order to actuate the switching pawls 70 or the switchable freewheels.

During the upshift of the gear unit 10, two switching pawls 70 of gear stages which follow one another are usually pivoted out at the same time, with the result that the idler gear 60 of the higher gear stage which runs more rapidly is immediately in engagement with the switching pawl 70, the switching pawl 70 of the lower gear stage which first of all corotates in the freewheel being pivoted in a second step. During the downshift from a higher into a lower gear stage of the gear unit 10, shifting is carried out from an idler gear 70 which runs more rapidly to an idler gear 70 which runs more slowly. Here, the switching pawls 70 of both idler gears 60 are likewise pivoted out, the load change to the idler gear of the lower gear stage which runs more slowly only taking place by active pivoting in of the switching pawl of the higher gear stage. Said load change requires a greater force which has to be applied to the actuating section 72 of the switching pawl for pivoting in, or else a withdrawal in the load of the gear unit, with the result that the static friction of the engagement section 76 in the internal toothing system 64 is reduced accordingly.

FIG. 6 diagrammatically shows the camshaft 84 in an axial viewing direction, in order to explain actuating sections of different configurations. FIG. 6 shows the actuating sections which are assigned to different idler gears of different gear stages in an overlapping manner in an axial projection, in order to clarify the differences. It goes without saying that the actuating sections which are assigned to different idler gears of different gear stages can also be configured at different rotary positions or angular positions of the camshaft 84.

The two actuating sections of the camshaft 84 Which are shown diagrammatically in FIG. 6 are denoted in general by 90 and 92. The actuating sections 90, 92 are configured as recesses in the round circumferential face 88 of the camshaft 84. In said embodiment, the camshaft 84 is rotated in the clockwise direction in order to downshift the gear stages of the gear unit 10, as shown by way of an arrow 94, and is rotated counter to the clockwise direction, in order to upshift the gear stages of the gear unit 10, as shown by way of an arrow 96.

The actuating sections 90, 92 in each case have a secant-shaped planar section 98, 100 which, during the downshift, first of all pivots out the switching pawl 70 which is in engagement with the internal toothing system 64 after the load change.

In order to pivot in the switching pawl 70, the actuating section 90 has surface sections which have different pitches, in order to exert different forces on the actuating section 72 of the switching pawl 70 in a manner which is dependent on a rotary angle a of the camshaft 84 and/or in order to rotate the respective switching pawl 70 to a different extent in a manner which is dependent on the rotary angle $\alpha$. Here, the pitch of the surface sections is the change in the radius of the actuating section 90 as a function of the corresponding rotary angle a of the camshaft 84.

Here, the actuating section 90 has three surface sections 102, 104, 106 which have different pitches. Here, the first surface section 102 has a low pitch which is calculated from the difference of the radii of the respective surface endpoints R1, R2 and the corresponding rotary angles $\alpha_1$, $\alpha_2$. The second surface section 104 has a higher pitch, since the corresponding radius (R3−R2) of the camshaft 84 changes to a more pronounced extent over a smaller rotary angle ($\alpha_3$−$\alpha_2$), and the third surface section 106 has the greatest pitch, since the radius (R4−R3) of the camshaft 84 changes to the most pronounced extent in said surface section 106 accordingly over the rotary angle ($\alpha_4$−$\alpha_3$). As a result, the corresponding switching pawl 70 is moved only slightly by way of the first surface section 102, and the greatest force is exerted on the engagement section 76, the switching pawl 70 being moved most rapidly by way of the third surface section 106, and the lowest force being exerted on the actuating section 72. In other words, the surface sections

102, 104, 106 of the actuating section 90 are of elevated or convex configuration with respect to the secant-shaped surface 98.

The second actuating section 92 has two surface sections 108, 110 which form a recess or are of concave configuration with respect to the secant-shaped surface 100. Said actuating section 92 does not serve to pivot in a switching pawl 70, but rather is assigned to an idler gear 60 of the lowest gear stage of the first component gear 26, from which a shift into a lower gear stage is not carried out. For this reason, the actuating section 92 can be of concave configuration. As a result, the surface section 110 which adjoins the circumferential face 88 has a very pronounced pitch, with the result that, during the upshift, the actuating section 72 is already pivoted out completely correspondingly in the case of a small rotation of the camshaft 94 by a small rotary angle ($\alpha_4 - \alpha_3$), as a result of which more shifting operations are possible during shifting in both component gears 26, 28, as is explained in greater detail in the further text.

The actuating section 92 with the concave shape is preferably assigned merely to the idler gear of a lowest gear stage of one of the component gears 26, 28 which is combined with the gear stages of the other component gear 26, 28, and the actuating sections 90 with the convex shape are assigned to all further gear stages of the gear unit 10. As a result, a downshift can be carried out under load simply and comfortably, and a more comfortable shifting operation can be carried out at the same time in both component gears 26, 28, since the switching pawl of the lowest gear stage can be pivoted out completely rapidly by way of a low rotary angle of the camshaft 84.

FIGS. 7a and b show diagrams to explain the rotary angle change of the switching pawl 70 as a function of the rotary angle change of the camshaft 84 for the surface sections 102, 104 and 106 from FIG. 6, and the ratio of the angular changes for the three surface sections 102, 104, 106.

In FIG. 7a, the rotary angle of the switching pawl 70 about the rotational axis 78 is denoted in general by $\varphi$ and is shown plotted against the rotary angle $\alpha$ of the camshaft 84. In a first section which corresponds to the first surface section 102, the rotary angle $\varphi$ of the switching pawl 70 changes slightly as a function of the rotary angle a of the camshaft 84. As a result, a favorable lever ratio is achieved, with the result that the camshaft 84 can be rotated with a low force and at the same time a comparatively great force can be exerted on the actuating section 72. As a result, in a first step, the static friction of the engagement section 76 in the internal toothing system 64 can be overcome and therefore the downshift under load can be simplified. A greater rotary angle change of the rotary angle $\varphi$ as a function of the rotary angle a of the camshaft 84 is achieved by way of the second surface section 104, the pitch of which is greater than that of the first surface section 102, with the result that the switching pawl 70 can be pivoted out more rapidly after the static friction is overcome at $\alpha_2$. At the rotary angle $\alpha_3$, the engagement section 76 is out of engagement with the internal toothing system 64, with the result that the switching pawls 70 are completely pivoted in rapidly and with low force by way of the third surface section 106 which has the greatest pitch.

FIG. 7b diagrammatically shows the ratio of the angular changes of the rotary angle y of the switching pawl 70 for the three surface sections 102, 104, 106. It becomes clear here that the smallest rotational movement of the switching pawl 70 as a function of the rotational movement a of the camshaft 84 is achieved by way of the low pitch of the first surface section 102 and, as a result, at the same time the greatest force is exerted on the actuating section 72 or the engagement section 76. The angular change Ay as a result of the second surface section 104 is considerably greater, since the static friction of the engagement section 76 has already been overcome here. The angle ratio $\Delta\alpha/\Delta\varphi$ for the third surface section 106 which has the greatest pitch is lowest, with the result that the greatest rotational movement of the switching pawl 70 is achieved here as a function of the rotary angle $\alpha$ of the camshaft 84.

By way of said special embodiment of the actuating section 90, a simple downshift under load and/or a simple disengagement of the switching pawl 70 under toad can be achieved.

The surface sections 102, 104, 106 can be configured as planar surfaces, as shown in FIG. 6, between which an edge or a kink is formed or which merge into one another via a rounded surface. In one preferred embodiment, the surface sections 102, 104, 106 are configured as continuously curved surfaces.

FIGS. 8a to d show sectional views of the gear unit 10, in order to explain an upshift operation of the gear unit 10, in which a shill is carried out in both component gears 6, 28.

The idler gears 38, 43, 48 and 49 are mounted on the shaft 82, the camshaft 84 being mounted in the shaft 82 in order to switch the idler gears of the first component gear 26, and a second camshaft 112 being mounted in the shaft 82 in order to shift the idler gears of the second component gear. The second camshaft 112 is rotated further by the first camshaft 84, for example by way of a driver after each complete revolution, or else is rotated independently via separate drive means. In one preferred embodiment, the second camshaft 112 is connected fixedly to the first camshaft 84 so as to rotate with it or is configured in one piece with the first camshaft 84.

Figure 8A:
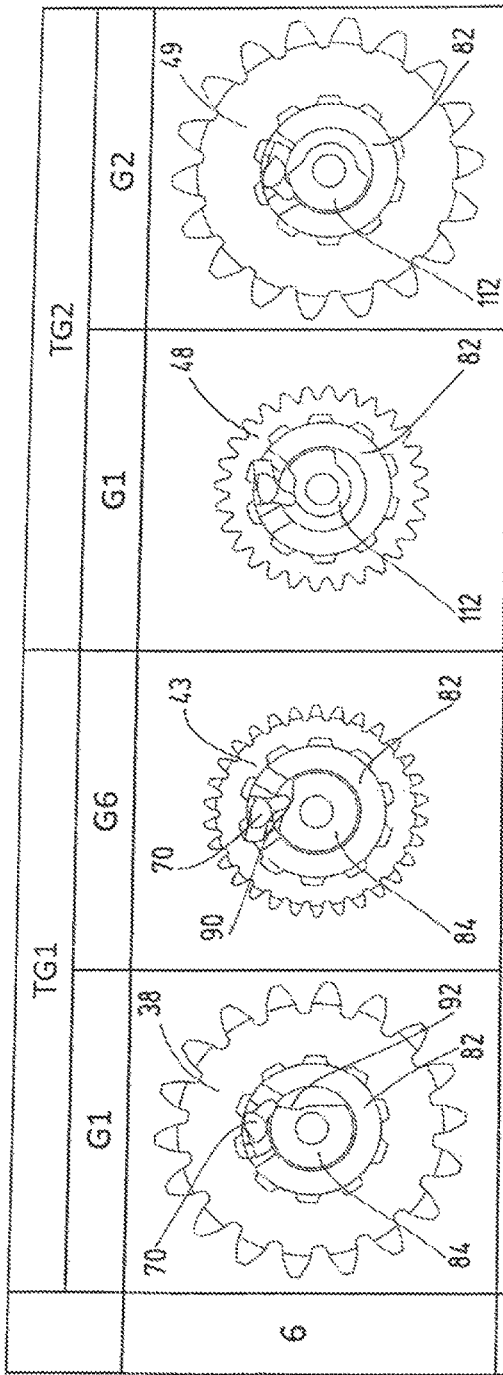

FIG. 8a diagrammatically shows the idler gears to be switched of the respective gear stages in an axial viewing direction. In the case which is shown here, a shift is carried out in the gear unit 10 from sixth gear into seventh gear, with the result that a shift is carried out in the first component gear 26 from sixth gear, that is to say the idler gear 43, into first gear, that is to say to the idler gear 38, and a shift is carried out in the second component gear 28 from first gear, that is to say the idler gear 48, into second gear, that is to say to the idler gear 49. FIG. 8a shows the starting state, the switching pawl 70 of the idler gear 43 being pivoted out and the switching pawl 70 of the idler gear 38 being pivoted in and, in the second component gear 28, the switching pawl 70 of the idler gear 48 being pivoted out and the switching pawl 70 of the idler gear 49 being pivoted in. As can be seen in FIG. 8a, the switching pawl 70 of the idler gear 38 is assigned the concave actuating section 92 and the idler gear 43 is assigned the convex actuating section 90.

Figure 8B:
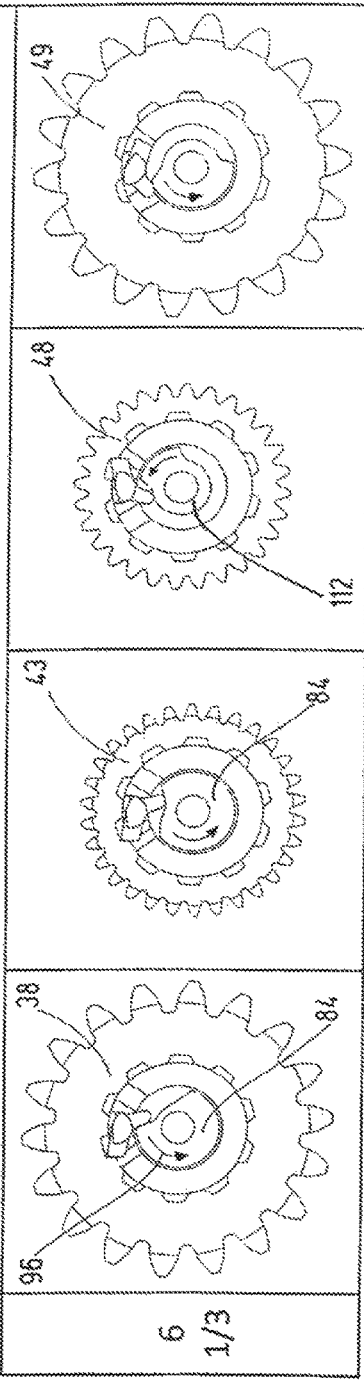

FIG. 8b shows a first step of three steps of the shifting operation for the correspondingly involved idler gears 38, 43, 48, 49. Here, the camshaft 84 is rotated counter to the clockwise direction 96 by from approximately 15° to 20°, with the result that the switching pawl 70 of the idler gear 38 pivots out completely. This is possible as a result of the particularly great pitch of the surface section 110 of the actuating section 92. Owing to the respective shapes of the actuating sections, the switching states of the remaining idler gears 43, 48, 49 are identical to the state from FIG. 8a. In other words, the switchable freewheels of the idler gears 38, 43 are actuated at the same time or the switching pawls 70 are pivoted out at the same time. By virtue of the fact that the idler gear 38 rotates more slowly in this switching state than the idler gear 43, the switching pawl 70 of the idler gear 38 slides on the sliding sections 66 of the idler gear 38, with the result that no load change takes place.

FIG. 8c shows a further second step of the shifting operation into seventh gear, the camshaft 84 being rotated counter to the clockwise direction 96 by a further 20° to 30°. In said second step (shown in FIG. 8c) of the shifting operation from sixth gear into seventh gear, the switching pawl 70 of the idler gear 43 is simultaneously pivoted in by way of the circumferential face 88 and the switching pawl 70 of the idler gear 49 is pivoted out. By virtue of the fact that the idler gears 43 and 49 in each case rotate more rapidly than the idler gears 38, 48, a load change between the gear stages or a load change to the idler gears 38 and 49 takes place by way of said pivoting in or out of the respective switching pawls 70. The pivoting in or out of the switching pawls 70 has to take place precisely and sequentially, with the result that the respective switching pawls are not in engagement at the same time with the respective internal toothing system 64, in order to avoid a brief upshift into twelfth gear. Said precise shifting operation is brought about by way of precise shaping of the respective actuating sections of the two camshafts 84, 112. In said state, in which the load change has already taken place, the gear unit 10 is effectively in seventh gear, but the switching pawl 70 of the idler gear 48 is pivoted out and corotates as a result of the slower rotational speed of the idler gear 48 or slides on the sliding sections 66 of the idler gear 48.

FIG. 8d diagrammatically shows a last, third step of the shifting operation into seventh gear. Here, the camshaft 84 is rotated further counter to the clockwise direction 96 by from approximately 15° to 20°, with the result that the switching pawl 70 of the idler gear 48 is pivoted in by way of the actuating section of the second camshaft 112. The remaining switching states of the switching pawls 70 of the idler gears 38, 43 and 49 are maintained in an identical manner. After said third step, the switchable freewheel of the idler gear 49 is actuated or activated. As a result, the corotation of the pivoted-out switching pawl 70 of the idler gear 48 is avoided and permanent clicking in said gear stage is suppressed.

In order to maintain the respective switching state, the camshaft 84 is fixed relative to the shaft 82 in the respective rotary positions, in which the individual gear stages are engaged. For example, said rotary positions are the rotary positions which are shown in FIGS. 8a and 8d. A gear change comprises a rotation of the camshaft 84 from one of the rotary positions, in which the camshaft 84 is fixed relative to the shaft 82, to a preceding or a following rotary position, in which the camshaft 84 is fixed relative to the shaft 82. To this end, the camshaft 84 or the drive means of the camshaft 84 is/are preferably configured with latching means, in order to fix the camshaft 84 relative to the shaft 82 in the rotary positions, in which the individual gear stages are engaged. The shifting operations take place between the latching positions and are concluded when the respective latching position is reached, as shown in FIG. 8d, for example.

In one special embodiment, the first component gear 26 can have at least one further idler gear which has a lower step-up transmission ratio or a step-down transmission ratio with a gearwheel than the idler gear 38. Said further idler gear or the gear pair of said further idler gear forms a lowest gear stage which is shifted merely in combination with the smallest gear stage of the second component gear 28. Said smallest gear stage can be selected, for example, as a special mountain gear and is not combined with the higher gear stages of the second component gear 28.

In said embodiment, the idler gear 38 forms a smallest gear stage of the first component gear 26, which gear stage is combined with a plurality of gear stages of the second component gear 28, the idler gear 38 still being assigned the concave actuating section 92. In other words, the idler gears 38 to 43 are shifted through in combination with the idler gears 48, 49 and 50 of the second component gear 28, and the further idler gear is combined merely with the idler gear 48.

In one special embodiment, the first component gear 26 can also have a plurality of further idler gears which, in each case with a gearwheel, form a gear pair which have a lower step-up transmission ratio or a step-down transmission ratio than the idler gear 38 and are shifted merely in combination with the smallest gear stage of the second component gear 28. As a result, a plurality of mountain gears can be provided.

Said shifting operation from sixth into seventh gear in three stages becomes possible by virtue of the fact that the first step from FIG. 8b is already carried out by way of a revolution of from approximately 15° to 20°. As a result, three independent sequential shifting steps from FIGS. 8b, 8c and 8d can be realized by way of one revolution of the camshafts 48, 112 by approximately 60°. It goes without saying that the individual shifting steps can be carried out by way of rotary angles of different magnitude of the camshafts 84, 112, depending on the shape of the actuating sections.

In contrast, gear changes which are carried out merely in the first one of the component gears 26 take place in two sequential steps, the switching pawl 70 or the freewheel of the idler gear 60 of the following gear stage being actuated in a first step and the switching pawl 70 of the preceding gear stage being pivoted in or the freewheel being released or deactivated in a second step. The respective load change takes place either in the first or second step, depending on whether an upshift or a downshift is carried out.

During shifting in both component gears 26, 28, the switching pawl 70 of the idler gear 43 is pivoted out and the switching pawl of the idler gear 49 is pivoted in a first step, with the result that the load is transmitted via the idler gear 43. In step 2, the switching pawl 70 of the idler gear 43 is pivoted in, and at the same time the switching pawl 70 of the idler gear 49 is pivoted out, said switching pawls being brought out of engagement or into engagement with the internal toothing system 46 at the same time or alternately. This means that the switching pawls 70 of the idler gears 43 and 49 are not out of engagement at the same time or in engagement at the same time with the internal toothing system 64, since otherwise briefly idling or briefly a shift into twelfth gear can take place.

In step 3, the switching pawls 70 of the idler gears 43 and 49 are correspondingly pivoted in completely or pivoted out completely, with the result that the switching state and the corresponding load change are concluded. The corresponding load change takes place by way of particularly precise adaptation of the actuating sections of the camshafts 84, 112, with the result that a precise synchronization of the two component gears 26, 28 is possible.

The invention claimed is:

1. A shilling device for a gear unit, having a shaft, on which a plurality of idler gears are mounted, the idler gears being connected to the shaft by means of switching pawls, the switching pawls being mounted rotatably and being capable of being actuated selectively by way of a camshaft, the camshaft being connected to drive means, in order to rotate the camshaft relative to the shaft in order to actuate the switching pawls, the camshaft having a plurality of actuating sections, in order to actuate the switching pawls which are assigned to the respective idler gears,
   wherein the actuating sections in each case have at least one surface section, and the surface sections which are assigned to the switching pawls of different idler gears have different pitches.

2. The shifting device as claimed in claim 1, wherein the switching pawls and the actuating sections which are assigned to different idler gears are configured in such a way that, upon actuation of the respective switching pawls, a change in the rotary angle of the camshaft brings about different changes in the rotary angle of the respective switching pawls.

3. The shifting device as claimed in claim 1, wherein the actuating sections which are assigned to the switching pawls of different idler gears have surface sections with different pitches at corresponding rotary angle positions of the camshaft.

4. The shifting device as claimed in claim 1, wherein the actuating sections which are assigned to the switching pawls of different idler gears have at least one surface section which has different angles of inclination relative to a respectively correspondingly adjoining circumferential face of the camshaft.

5. The shifting device as claimed in claim 4, wherein, upon a rotation of the camshaft in order to shift into a higher gear stage of the gear unit, the surface section which adjoins the circumferential face is configured to pivot out the switching pawls.

6. The shifting device as claimed in claim 1, wherein the pitch of a surface section which is assigned to a first one of the idler gears is greater than the pitch of the surface sections which are assigned to a plurality of further ones of the idler gears.

7. The shifting device as claimed in claim 6, wherein the first idler gear is assigned to a gear stage of the gear unit Which is lower than at least one further gear stage of the gear unit.

8. A shifting device tor a gear unit, having a shaft, on which a plurality of idler gears are mounted, the idler gears being connected to the shaft by means of switching pawls, the switching pawls being mounted rotatably and being capable of being actuated selectively by way of a camshaft, the camshaft being connected to drive means, in order to rotate the camshaft relative to the shaft in order to actuate the switching pawls, the camshaft having a plurality of actuating sections, in order to actuate the switching pawls which are assigned to the respective idler gears, wherein at least one actuating section has a plurality of surface sections with different pitches, in order to exert different forces on the switching pawls as a result of the rotation of the camshaft in a manner which is dependent on a rotary position of the camshaft or in order to pivot the switching pawls in or out at different rotational speeds.

9. The shifting device as claimed in claim 8, Wherein the surface sections form planar surfaces with the different pitches.

10. The shifting device as claimed in claim 8, wherein at least one of the actuating sections is of convex configuration at least in sections in an axial viewing direction with regard to a secant of the camshaft.

11. The shifting device as claimed in claim 8, wherein an actuating section is of concave configuration at least in sections in an axial viewing direction with respect to a secant of the camshaft.

12. The shifting device as claimed in claim 8, wherein the pitch of the surface sections increases at least in sections in a rotational direction of the camshaft for pivoting in the respective switching pawl.

13. The shifting device as claimed in claim 12, wherein the pitch of three surface sections which follow one another in the rotational direction increases.

14. A shifting device for a gear unit, having a shaft, a first plurality of idler gears of a first component gear of the gear unit and a second plurality of idler gears of a second component gear of the gear unit, the idler gears being connected to the shaft by means of switchable freewheels, and having at least one camshaft which has a plurality of actuating sections, in order to actuate switchable freewheels, and the at least one camshaft being connected to drive means, in order to rotate the camshaft relative to the shaft for selectively actuating switchable freewheels, wherein the actuating sections are configured to perform a gear change in both component gears in a plurality of steps which Mow one another, the actuating sections being of different configuration in such a way that the gear change in the two component gears has at least one more step than a gear change in merely one of the component gears.

15. The shifting device as claimed in claim 14, wherein the actuating sections are configured, in the case of a gear change in both component gears, to simultaneously actuate the freewheels of two idler gears in a first of the component gears before a load change between in each case two idler gears of the two component gears, and to release the freewheel of one of the idler gears after the load change in a second of the component gears.

16. The shifting device as claimed in claim 14, wherein the one camshaft and a second camshaft are synchronized in such away that, in the case of the load change, the switchable freewheels of two idler gears which are assigned to in each case different ones of the component gears are at least one of actuated and released alternately.

17. The shifting device as claimed in claim 14, wherein the actuating sections are configured in such a way that the gear change in the two component gears takes place substantially in three steps which follow one another.

18. The shifting device as claimed in claim 14, wherein the steps of the gear change take place in different rotational positions of the camshafts.

19. The shifting device as claimed in claim 14, wherein the freewheel of merely one of the idler gears is actuated after a load change in the second component gear.

* * * * *